United States Patent
Bellenfant et al.

(10) Patent No.: US 10,144,266 B2
(45) Date of Patent: Dec. 4, 2018

(54) TUBE HAVING A CONTAINER OF PHASE CHANGE MATERIAL FOR A HEAT EXCHANGE BUNDLE, IN PARTICULAR FOR AN EVAPORATOR OF AN AIR CONDITIONING SYSTEM OF A VEHICLE

(71) Applicant: Valeo Systemes Thermiques, Le Mesnil Saint Denis (FR)

(72) Inventors: Aurelie Bellenfant, Roeze sue Sarthe (FR); Jean-Christophe Prevost, Ligron (FR); Lionel Robillon, Mulsanne (FR); Fabienne Tourneux, Le Mans (FR); Philippe Doucet, Sable-sue-Sarthe (FR)

(73) Assignee: VALEO SYSTEMS THERMIQUES, Le Mesnil Saint Denis (FR)

( * ) Notice: Subject to any disclaimer, the term of this patent is extended or adjusted under 35 U.S.C. 154(b) by 289 days.

(21) Appl. No.: 14/899,831

(22) PCT Filed: Jun. 16, 2014

(86) PCT No.: PCT/EP2014/062552
§ 371 (c)(1),
(2) Date: Dec. 18, 2015

(87) PCT Pub. No.: WO2014/202523
PCT Pub. Date: Dec. 24, 2014

(65) Prior Publication Data
US 2016/0137019 A1    May 19, 2016

(30) Foreign Application Priority Data
Jun. 20, 2013 (FR) ..................................... 13 55879

(51) Int. Cl.
*F28D 20/02* (2006.01)
*B60H 1/00* (2006.01)
(Continued)

(52) U.S. Cl.
CPC .............. *B60H 1/005* (2013.01); *B23P 15/26* (2013.01); *F28D 1/0341* (2013.01);
(Continued)

(58) Field of Classification Search
CPC ..... F28D 2020/0013; F28D 2021/0085; F28D 1/05391
(Continued)

(56) References Cited

U.S. PATENT DOCUMENTS 3,757,855 A * 9/1973 Kun et al. ............. F28D 1/0391
165/148
8,122,943 B2 * 2/2012 Haller et al. .......... F28D 1/0535
165/10
(Continued)

FOREIGN PATENT DOCUMENTS

DE   10 2004 052 979 A1   5/2006
DE   10 2006 011 327 A1   9/2007
(Continued)

OTHER PUBLICATIONS

International Search Report for Application No. PCT/EP2014/062552 dated Aug. 4, 2014, 8 pages.
(Continued)

*Primary Examiner* — Allen Flanigan
(74) *Attorney, Agent, or Firm* — Howard & Howard Attorneys PLLC

(57) ABSTRACT

A tube (13) has a container of phase change material M for a heat exchange bundle (3) of a heat exchanger (1) of an air conditioning system of a passenger compartment of a vehicle. The tube (13) includes a first plate (15) configured to form a first outer surface (17) of the tube (13), a second plate (19) configured to be sealingly assembled with the first plate (15) and to form a second outer surface (21) opposite the first outer surface (17), and an intermediate plate (23)

(Continued)

configured to be sealingly assembled with the first and second plates (15, 19), between the latter, and to define on either sides thereof at least one channel (9) for the flow of a coolant F into the bundle (3) and at least one recess (25) for the phase change material M. The invention also relates to a heat exchange bundle and to a method for assembling a heat exchanger including the tube (13).

15 Claims, 3 Drawing Sheets

(51) Int. Cl.
    *F28D 1/03*         (2006.01)
    *B23P 15/26*      (2006.01)
    *F28D 20/00*      (2006.01)
    *F28D 1/053*      (2006.01)
    *F28D 21/00*      (2006.01)

(52) U.S. Cl.
    CPC ........... *F28D 1/0375* (2013.01); *F28D 20/02* (2013.01); *F28D 1/05358* (2013.01); *F28D 2020/0013* (2013.01); *F28D 2021/0085* (2013.01); *Y02E 60/145* (2013.01)

(58) Field of Classification Search
    USPC .......................................... 165/10, 153, 177
    See application file for complete search history.

(56) References Cited

U.S. PATENT DOCUMENTS

| | | |
|---|---|---|
| 8,464,550 B2 | 6/2013 | Kerler et al. |
| 2004/0093889 A1* | 5/2004 | Bureau et al. ..... B60H 1/00321 62/434 |
| 2010/0065244 A1* | 3/2010 | Yokoyama et al. ........................ F28D 1/05383 165/10 |
| 2010/0223949 A1* | 9/2010 | Higashiyama et al. .................... F25B 39/022 62/519 |
| 2010/0307180 A1* | 12/2010 | Yamada et al. ....... F28D 1/0333 62/285 |
| 2011/0239696 A1* | 10/2011 | Takagi ............... B60H 1/00335 62/524 |
| 2012/0042687 A1* | 2/2012 | Kamoshida et al. ... F25B 39/02 62/524 |
| 2012/0272679 A1 | 11/2012 | Vreeland et al. |

FOREIGN PATENT DOCUMENTS

| | | |
|---|---|---|
| EP | 2 293 001 A2 | 3/2011 |
| FR | 2 878 614 A1 | 6/2006 |
| JP | 2000-205777 A | 7/2000 |
| JP | 2001-191175 A | 7/2001 |

OTHER PUBLICATIONS

English language abstract and machine-assisted English translation for DE 10 2004 052 979 extracted from espacenet.com database on Jan. 27, 2016, 10 pages.

English language abstract for DE 10 2006 011 327 extracted from espacenet.com database on Jan. 27, 2016, 1 page.

English language abstract and machine-assisted English translation for EP 2 293 001 extracted from espacenet.com database on Jan. 27, 2016, 22 pages.

English language abstract and machine-assisted English translation for FR 2 878 614 extracted from espacenet.com database on Jan. 27, 2016, 25 pages.

English language abstract and machine-assisted English translation for JP 2000-205777 extracted from espacenet.com database on Jan. 27, 2016, 16 pages.

English language abstract and machine-assisted English translation for JP 2001-191175 extracted from espacenet.com database on Jan. 27, 2016, 12 pages.

\* cited by examiner

TUBE HAVING A CONTAINER OF PHASE CHANGE MATERIAL FOR A HEAT EXCHANGE BUNDLE, IN PARTICULAR FOR AN EVAPORATOR OF AN AIR CONDITIONING SYSTEM OF A VEHICLE

RELATED APPLICATIONS

This application is the National Stage of International Patent Application No. PCT/EP2014/062552, filed on Jun. 16, 2014, which claims priority to and all the advantages of French Patent Application No. FR 13/55879, filed on Jun. 20, 2013, the content of which is incorporated herein by reference.

The present invention relates to a tube having a store of phase-change material for a heat exchange core of a heat exchanger, in particular for an evaporator of an air conditioning circuit of a vehicle. The invention also relates to the core and to the exchanger that are obtained, as well as to a method for assembling said exchanger.

Exchangers that comprise a core of parallel tubes formed from plates containing a refrigerant are known, an external air flow passing through the core and sweeping over the tubes of which the surface, which has been enlarged by adding disruptors or spacers between the tubes, optimises the heat exchange.

It is known to provide these heat exchangers with stores of phase-change material that are connected to the tubes of the core, which tubes are used for circulating the refrigerant. Exchangers of this type allow a passenger compartment of a vehicle to remain cold for a given period of time when the engine of the vehicle is idle and is no longer driving the compressor for circulating the refrigerant, in particular for vehicles provided with a system for automatically stopping the engine when the vehicle is idle for a short time. During these periods when the engine is idle, the phase-change material actually restores the cold to the air passing through the exchanger.

In particular, an evaporator for a vehicle air conditioning circuit is known, comprising a heat exchange core provided with a set of tubes through which refrigerant flows, a store for storing phase-change material being joined to the tubes and an air passage being provided between the tubes and the stores for storing cold, in particular by means of protrusions and indentations formed therebetween. In these exchangers, the cold heat transfer between the refrigerant tubes and the phase-change material stores is reduced, on one hand, by the presence of said protrusions and indentations extending on a large surface of each of the tubes and, on the other hand, by the thickness of the material involved in the heat transfer from the tube to the store. Indeed, said thickness includes the wall of the tube and the wall of the store.

The object of the present invention is to overcome all or some of these drawbacks.

To this end, a tube having a store of phase-change material for a heat exchange core of a heat exchanger, in particular an evaporator of an air conditioning circuit for a passenger compartment of a vehicle, is proposed according to the invention.

According to the invention, said tube comprises a first plate designed to form a first outer surface of the tube, a second plate designed to be connected to said first plate in a sealed manner and to form a second outer surface opposite said first outer surface, and an intermediate plate designed to be connected to said first and second plates in a sealed manner, between said plates, and to define on either side of itself at least one duct for the flow of said refrigerant in said core and at least one recess for said phase-change material.

Thus, the refrigerant is in contact with the phase-change material by means of said intermediate plate and the cold heat transfer is carried out through the wall of said plate. Unlike in the aforementioned exchanger, a volume of thermally insulating air does not reduce said heat transfer. In addition, there is only one wall thickness to ensure this transfer: that of the intermediate plate of which the thickness can advantageously be reduced in relation to that of an outer plate since said intermediate plate is not subjected to shocks or external impacts. Furthermore, distributing the assembly of the phase-change material on one side of the intermediate plate and the refrigerant material on the other side of the intermediate plate makes it possible to arrange a reliable and sturdy tube.

According to other features of the invention, which can be taken in isolation or in combination:
- said second plate is provided with an outer surface designed to be in contact with an external air flow passing through said core, in particular to allow heat exchange between the phase-change material and said air flow,
- said outer surface is provided with cells which are designed to increase the heat transfer surface area,
- said cells each comprise a frustoconical apex, which promotes the flow of said air flow on the surface and reduces the head loss of the air flow,
- said cells are identical to one another,
- said cells are adjacent to one another,
- said cells are arranged in honeycomb form in relation to one another,
- said intermediate plate is made of an identical material to that of the first and second plates,
- said intermediate plate is made of a material of which the heat transfer capacity is greater than that of the first and second plates,
- said intermediate plate is provided with stiffening ribs, which allows the thickness of the wall thereof to be reduced further,
- said intermediate plate is provided with at least one connecting rib capable of being connected to said first plate and intended to define said duct(s) for the refrigerant,
- said first plate is designed to receive a spacer for heat transfer with said air flow on the first outer surface of the tube,
- said first plate has a shape corresponding to a standard-tube plate of the core, i.e. does not comprise a phase-change material store,
- said first and second plates and/or said intermediate plate are designed to be joined to one another at their periphery,
- said first plate and/or said second plate are designed to allow said first and second plates and/or said intermediate plate to be preassembled, for example by means of peripheral tabs on the first plate which can be folded down onto the edge of the second plate,
- said tube having a store of phase-change material is designed to be connected to a second identical tube, in particular by positioning their recessed outer surfaces to be substantially opposite one another,
- said second plate is designed to be joined to a second plate of said second tube in a position facing one another, the cells of each of said second plates being joined together by their apexes, said tube having a store of phase-change material is designed so that, when connected to said second tube in said mutually facing position, said assembly of tubes can be exchanged with an assembly of a standard tube of said core and of a standard spacer for said core, i.e. a spacer between two standard tubes of said core.

The invention also relates to a heat exchange core for a heat exchanger, in particular an evaporator of an air conditioning circuit of a motor vehicle, comprising at least one tube having a store of phase-change material, as described above.

Said core is advantageously designed to comprise a plurality of said tubes having a store of phase-change material, the number of said tubes among the standard tubes being adapted to the need for production of cold in said passenger compartment of the vehicle.

Said core advantageously comprises at least one said assembly of two said tubes having a store of phase-change material, in a mutually facing position.

The invention also relates to a heat exchanger, in particular an evaporator of an air conditioning circuit of a motor vehicle, comprising at least one heat exchange core as described above.

The invention also relates to a method for assembling a heat exchanger, comprising the steps of at least preassembling, in a mutually facing position, two tubes having a store of phase-change material, and arranging said preassembly between two standard tubes of said core to allow the exchanger to be preassembled before its assembly.

Other features and advantages of the invention will become apparent upon reading the following description of embodiments, given by way of illustration with reference to the appended drawings, in which.

Figure 1:
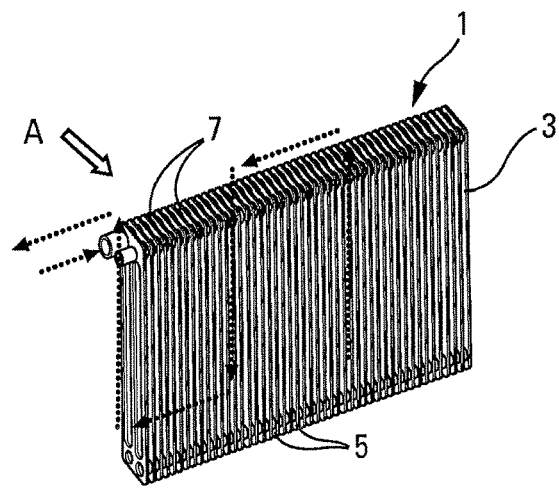
FIG. 1 is a perspective view of a heat exchanger according to an embodiment of the invention.

It should be noted that the drawings disclose the invention in a detailed manner, and they can naturally be used to better define the invention if necessary.

Lastly, identical reference numerals are used to designate identical or like elements.

Figure 2:
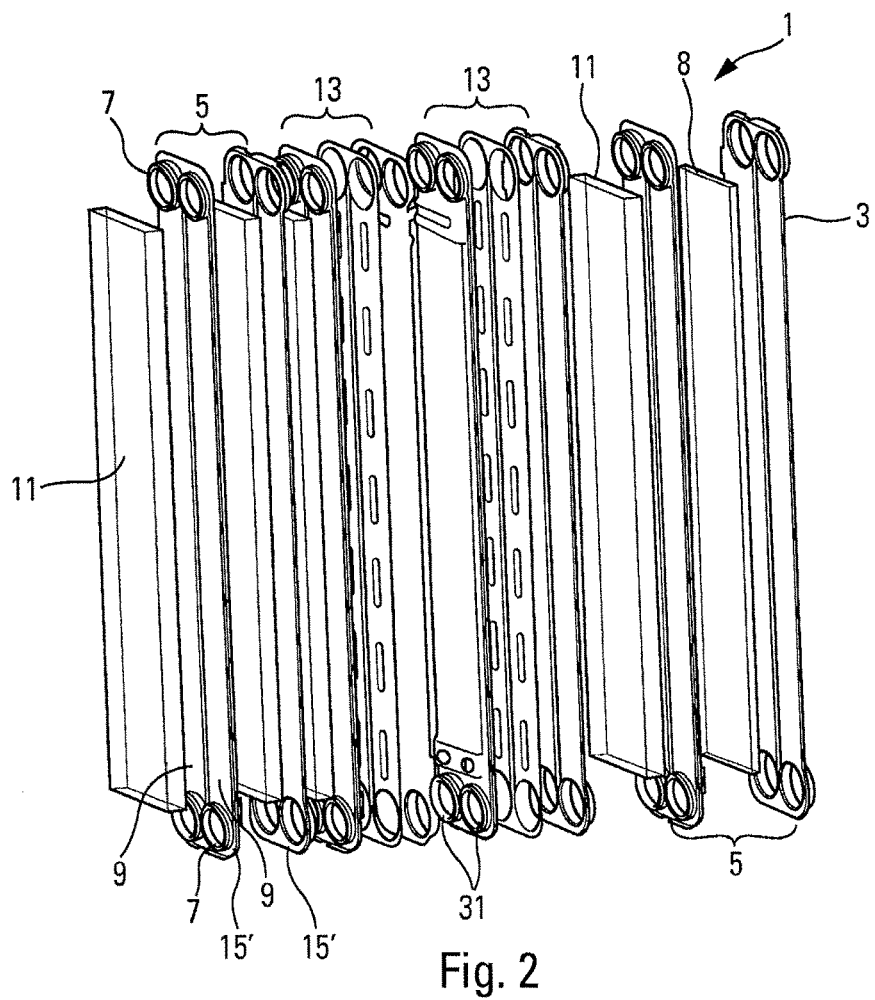
FIG. 2 is an exploded view of a portion of the exchanger of FIG. 1.

As shown in FIGS. 1 and 2, the invention relates to a heat exchanger 1 which can, for example, be an evaporator of an air conditioning loop of a passenger compartment of a motor vehicle.

As is known, structurally the exchanger 1 comprises a core 3 of parallel tubes 5 which are interconnected, for example by their ends. In this case, said tubes 5 allow the refrigerant F to flow in two parallel ducts 9 of the tube 5, in a first duct 9 in a first flow direction of the fluid in the tube and in a second duct 9 in an opposite flow direction, respectively. In particular, the tubes 5 in which the refrigerant F flows have an oblong cross section and between them spacers 11 are arranged which increase the surface area for heat exchange between the refrigerant F flowing in the exchanger 1 and an external air flow A passing through said exchanger.

In this case, said tubes 5 are formed by a first plate 15' and a second plate 15'. Said plates comprise, for example, a bottom and a raised peripheral edge which, once said plates are connected, define an internal flow space for the refrigerant. In this case, one plate and/or the other of said plates further comprise a longitudinal rib separating each of the ducts 9.

Said exchanger advantageously comprises refrigerant collectors for introducing refrigerant into said tubes 5 and/or extracting it therefrom, for example from and/or towards inlets/outlets for the refrigerant in the exchanger. To do so, said plates can comprise, at their end, collars 7, formed in particular by stamping, to allow the refrigerant to flow from one tube 5 to the other. Said collars 7 are designed in particular to create communication with the collars of the adjacent tubes. Here, they are located at each end of said ducts 9.

The interior of the tubes 5 can also include disruptors, in particular an undulated disruptor 8, which define conduits for the flow of the refrigerant inside the tube.

Internal partitions (not shown) located in the collectors can be used to make the fluid flow in a plurality of successive channels, according to the arrows in dashed lines in FIG. 1, within the core.

That said, the core 3 comprises standard tubes 5, as described above, and tubes 13 according to the invention for defining a phase-change material store. The latter tubes will be described below.

As mentioned above, the tubes 13 having a store of phase-change material allow a passenger compartment of a vehicle to remain cold for a given period of time, in particular when the engine of the vehicle is idle for a short time, during which the phase-change material M restores the cold to the air A passing through the exchanger.

Each of said tubes 13 comprises a first plate 15 designed to form a first outer surface 17 of the tube. Each of said tubes also comprises a second plate 19 designed to be connected to said first plate 15 in a sealed manner and to form a second outer surface 21, which is opposite said first outer surface 17. It also comprises an intermediate plate 23 designed to be connected to said first and second plates 15, 19 in a sealed manner, between said plates. Said intermediate plate 23 is designed to define, on either side thereof, at least one duct 9 for the flow of said refrigerant F in said core 3, and at least one recess 25 for said phase-change material M.

Thus, the refrigerant F is in thermal contact with the phase-change material M by means of said intermediate plate 23 and the cold heat transfer is carried out through the wall 27 of said plate. Furthermore, distributing the assembly of the phase-change material M on one side of the intermediate plate 23 and the refrigerant F on the other side of the intermediate plate 23 makes it possible to arrange a tube that allows cores of small depth to be produced.

The phase-change material M (PCM) restores the accumulated cold transmitted by the tube 13, said restoration being activated upon a change of phase. The phase-change material M is in particular a biphasic material, in which the cold is restored when said material changes from one phase to the other, upon contact with the hotter air flow A, when the refrigerant flow is interrupted. The phase change in the opposite direction is brought about as a result of cold produced by the refrigerant once it flows again.

More specifically, said second plate 19 is provided with an outer surface 29 designed to be in contact with the external air flow A passing through said core, in particular to allow heat exchange between the phase-change material M and said air flow A. When the phase-change material M changes phase, it thus cools said air flow A.

Figure 3:
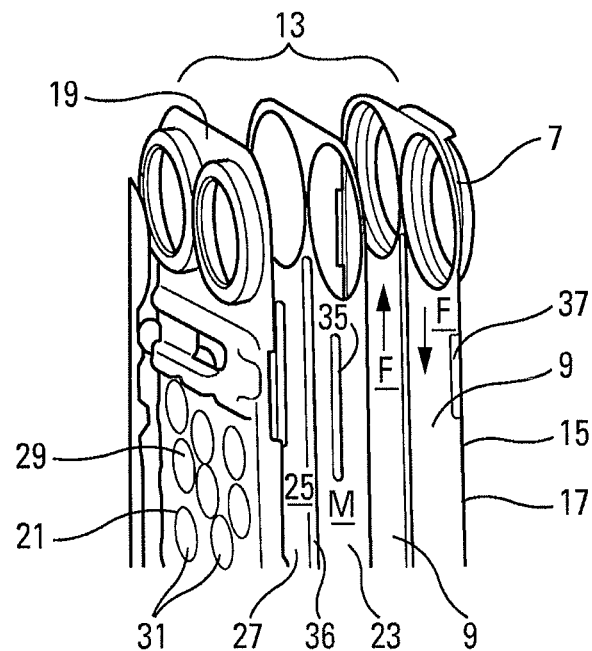
FIG. 3 is an exploded enlarged partial view showing a tube having a store of phase-change material from the exchanger of FIG. 1.
Figure 4:
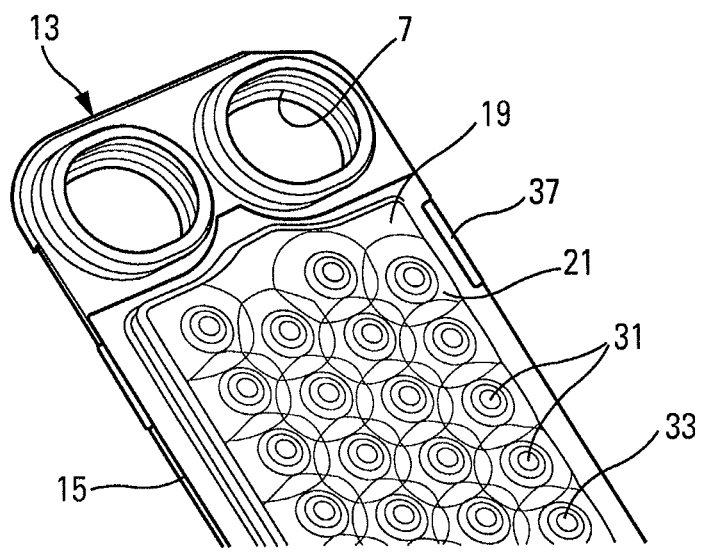
FIG. 4 is a perspective partial view showing the outer surface of the tube from FIG. 3.

As can be seen in particular in FIGS. 3 and 4, said outer surface 29 can be provided with cells 31 which are designed to increase the heat transfer surface area between the phase-change material M and said air flow A.

In this case, said cells 31 each comprise a frustoconical apex 33, and this makes it possible for said air flow A to flow on the surface 29 and reduces the head loss of the air flow. In particular, these cells 31 are identical to one another, in particular adjacent to one another, and this increases the surface area in contact with the air flow.

Said cells 31 are advantageously arranged in honeycomb form in relation to one another in order to promote the heat exchange with the air flow A.

Said intermediate plate 23 is made of an identical material to that of the first and second plates 15, 19, i.e. of aluminium and/or an aluminium alloy. In a variant, said plate can be made of a material of which the heat transfer capacity is greater than that of the first and second plates 15, 19, and can possibly be made of a more rigid material.

Said intermediate plate 23 is in particular provided with stiffening ribs 35, which makes it possible to further reduce the thickness of the wall thereof and to contain the pressure differential between the refrigerant F on one side of said plate and the phase-change material M on the other side.

Said intermediate plate 23 is likewise provided with a rib 36 for connecting the intermediate plate 23 to said first plate 15, such that said plates define said duct(s) 9 (two in this case) for the refrigerant F.

Said first plate 15 can be designed to receive a spacer 11, identical to those 11 mentioned above, for heat transfer with said air flow on the first outer surface 17 of the tube. For example, this plate has a shape corresponding to a standard-tube plate 15' of the core, i.e. does not comprise a store of phase-change material. Said plate can advantageously be identical to such a plate 15' of a standard tube.

Said first and second plates 15, 19 and/or said intermediate plate 23 are advantageously designed to be joined together at their periphery, for example at a raised edge similar to that of the standard plates 15'. Said first plate 15 can further be designed to allow said first and second plates 15, 19 and/or said intermediate plate 23 to be preassembled, for example by peripheral tabs 37 on the first plate 15 which can be folded down onto the edge of the second plate 19, as shown in FIGS. 3 and 4.

Figure 5:
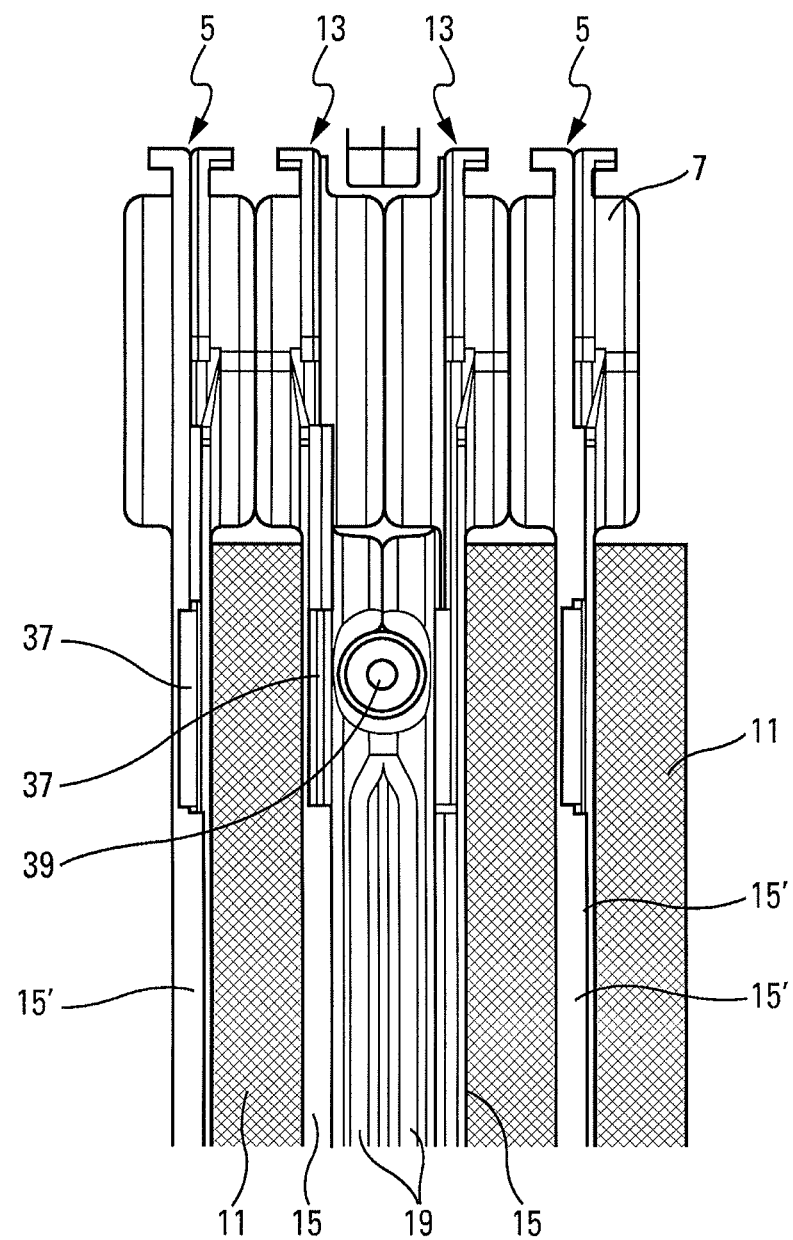
FIG. 5 is a cross-sectional view of an assembly of two tubes having a store of phase-change material, in a mutually facing position, arranged between two standard tubes of the core of the exchanger of FIG. 1.

Said tube 13 having a store of phase-change material can be designed to be connected to a second identical tube 13, in a mutually facing position, as can be seen in FIGS. 2 and 5. Said second plate 19 can advantageously be designed to be joined to a second plate 19 of said second tube 13 in a mutually facing position, in which the cells 31 of each of said second plates are joined together by their apexes 33. The ratio between the heat exchange and the head loss of the air flow A in contact with the cells 31 is thus optimised.

Said tube 13 having a store of phase-change material is in this case also designed so that, when connected to said second tube 13 and when in said mutually facing position, said assembly of tubes can be exchanged with an assembly of one said standard tube 5 and of a standard spacer 11 of said core, i.e. a spacer 11 between two standard tubes 5 of said core. It is thus simple to design the exchanger by replacing standard elements, without having to change the tube spacing.

It should be noted that replacing the phase-change material M, which is preferably in liquid form in the appropriate temperature conditions, can be carried out by means of an opening in each tube having a store of phase-change material, advantageously by means of a pipe 39 that is shared by an assembly of tubes in a top to tail position, as can be seen in FIG. 5.

The invention also relates to the heat exchange core 3 for said heat exchanger 1, in particular an evaporator of an air conditioning circuit of a motor vehicle. Such a core 3 comprises at least one tube 13 having a store of phase-change material, as described above, and advantageously comprises a plurality of said tubes 13 having a store of phase-change material, the number thereof being adapted to the need for producing cold in said passenger compartment of the vehicle.

Said core 3 advantageously comprises at least one said assembly of tubes 13 having a store of phase-change material, in a mutually facing position, in particular a plurality of said assemblies of tubes 13 having a store of phase-change material, in a mutually facing position distributed along the length of the core 3. The pairs of tubes 13 having a store of phase-change material can be arranged next to one another and/or distributed between assemblies of one said standard tube 5 and one said standard spacer 11 of the core.

The invention also relates to the heat exchanger 1, in particular an evaporator of an air conditioning circuit of a motor vehicle, comprising at least one heat exchange core 3 as described above.

The invention also relates to a method for assembling such a heat exchanger 1.

The method comprises the steps of at least preassembling, in a mutually facing position, two tubes 13 having a store of phase-change material, and arranging said preassembly between two standard tubes 5 of said core, as shown in FIG. 5, to allow the exchanger to be preassembled before its assembly. This is carried out, for example, by passing through a brazing furnace.

This invention thus provides a tube having a store of phase-change material for a heat exchange core of a heat exchanger, in particular an evaporator of an air conditioning circuit of a passenger compartment of a vehicle, which tube is reliable and sturdy, creates very efficient heat transfer between the tube and the refrigerant and between the tube and the air flow that are in contact, and which makes it easier to design the heat exchanger to correspond to the need for cooling the passenger compartment.

The invention claimed is:

1. A tube (13) having a store of phase-change material M for a heat exchange core (3) of a heat exchanger (1) of an air conditioning circuit of a passenger compartment of a vehicle, said tube (13) comprising a first plate (15) designed to form a first outer surface (17) of said tube (13), a second plate (19) designed to be connected to said first plate (15) in a sealed manner and to form a second outer surface (21) opposite said first outer surface (17), and an intermediate plate (23) designed to be connected to said first and second plates (15, 19) in a sealed manner, between said plates (15, 19), and to define on either side of itself at least one duct (9) for the flow of refrigerant F in said core (3) and at least one recess (25) for said phase-change material M, wherein said intermediate plate (23) is made of a material of which the heat transfer capacity is greater than that of said first and second plates (15, 19).

2. A tube (13) having a store of phase-change material according to claim 1, wherein said second plate (19) is provided with an outer surface (29) which is designed to be in contact with an external air flow A passing through said core (3).

3. A tube (13) having a store of phase-change material according to claim 2, wherein said outer surface (29) is provided with cells (31) which are designed to increase the surface area for heat transfer between said phase-change material M and the air flow A.

4. A tube (13) having a store of phase-change material according to claim 3, wherein said cells (31) each comprise a frustoconical apex (33).

5. A tube (13) having a store of phase-change material according to claim 3, wherein said cells (31) are adjacent to one another.

6. A tube (13) having a store of phase-change material according to claim 1, wherein said intermediate plate (23) is provided with at least one connecting rib (36) capable of being connected to said first plate (15) and for defining said at least one duct (9) for the refrigerant F.

7. A tube (13) having a store of phase-change material according to claim 1, wherein said first plate (15) is designed to receive a spacer (11) for heat transfer with the air flow A on said first outer surface (17) of the tube (13).

8. A tube (13) having a store of phase-change material according to claim 1, wherein said first and/or second plate (15, 19) is/are designed to allow said first and second plates (15, 19) and/or said intermediate plate (23) to be preassembled.

9. A tube (13) having a store of phase-change material according to claim 1, configured to be connected to a second identical tube (13).

10. A tube (13) having a store of phase-change material according to claim 9, configured so that, when assembled to said second tube (13) to be connected in a mutually facing position, said assembly of tubes (13) can be exchanged for an assembly of a standard tube (5) and of a standard spacer (11) of said core (3).

11. A heat exchange core (3) for a heat exchanger (1) of an air conditioning circuit of a motor vehicle, said heat exchange core (3) comprising at least one tube (13) having a store of a phase-change material according to claim 1.

12. A heat exchanger (1) of an air conditioning circuit of a motor vehicle, said heat exchanger (1) comprising at least one heat exchange core (3) according to claim 11.

13. A method for assembling a heat exchanger (1) according to claim 12, comprising the steps of preassembling, in a mutually facing position, two tubes (13) having a store of phase-change material, and arranging the preassembly between two standard tubes (5) of the core (3) to allow the heat exchanger (1) to be preassembled before its assembly.

14. A tube (13) having a store of phase-change material according to claim 4, wherein said cells (31) are adjacent to one another.

15. A tube (13) having a store of phase-change material according to claim 1, wherein said first and/or second plate (15, 19) is/are designed to allow said first and second plates (15, 19) and/or said intermediate plate (23) to be preassembled by means of peripheral tabs on the first plate (15) which is folded down onto the edge of the second plate (19).

* * * * *